Oct. 6, 1953

M. D. BRAID 2,654,244

REBOUND HARDNESS MEASURING DEVICE

Filed Dec. 6, 1949

Inventor
Murray Douglas Braid

By The Firm of Charles Follett Attys

Oct. 6, 1953 M. D. BRAID 2,654,244
REBOUND HARDNESS MEASURING DEVICE
Filed Dec. 6, 1949 2 Sheets-Sheet 2

Inventor
Murray Douglas Braid
By The firm of Charles Hill Attys

Patented Oct. 6, 1953

2,654,244

UNITED STATES PATENT OFFICE 2,654,244

REBOUND HARDNESS MEASURING DEVICE

Murray Douglas Braid, Painesville, Ohio, assignor to Thompson Products, Inc., Cleveland, Ohio, a corporation of Ohio Application December 6, 1949, Serial No. 131,317

5 Claims. (Cl. 73—79)

This invention relates to improvements in measuring devices and more particularly relates to an improved measuring device adapted to measure the hardness of materials by measuring the rebound of a hammer dropped from a predetermined elevation.

Heretofore, the hardness of metals and other materials has commonly been measured by an instrument known to the trade as "Shore's Standard Scleroscope." In this instrument a diamond tipped drop hammer is hung at the top of a glass tube in readiness to test the hardness of the material. The dropping of the hammer is controlled by a bulb which, when pressed, exerts pressure on a cylinder and moves a cam to open a valve to the tube chamber to admit air therein. The cam then releases the hammer. In order to bring the hammer back to its initial position the bulb again must be pressed to move the cam to a neutral position to permit the valve to close and position the hanger to engage the drop hammer as it moves upwardly along the tube. When the valve is closed and the bulb is suddenly released, a vacuum is created in the tube chamber by release of the bulb to draw up the drop hammer to such an elevation that it may be caught and held by the hooks of the measuring device.

Such measuring devices have been designed primarily as laboratory instruments and for this reason have never been satisfactory for production use, the reasons being that they must frequently be readjusted and the operation of the bulb is slow and tiresome and creates a serious fatigue factor making it impractical and unduly expensive to use these instruments to measure the hardness of articles on a production basis.

A principal object of my invention is to remedy these difficulties by providing a rebound hardness testing instrument so arranged as to increase the life of the device and decrease fatigue factors present in operating the instrument by constructing it for positive operation by suction supplied and controlled externally of the instrument.

A further object of my invention is to provide a new and improved form of rebound testing instrument, the operation of which may be controlled by the simple shifting of a mechanical valve remote from the instrument.

A still further object of my invention is to provide a novel and improved form of rebound hardness testing instrument for metals so constructed as to be operated in a more facile and positive manner than formerly and to reduce the frequency the device must be regulated to maintain its accuracy.

A still further object of my invention is to provide a rebound testing instrument of a simpler construction than formerly in which the dropping and raising of the rebound hammer is positively effected and controlled by suction created by an external source of suction and controlled by the operator by the simple operation of a switch.

A further and more detailed object of my invention is to provide a simplified form of rebound testing instrument suitable for production purposes in which all operations of the device may be controlled by suction supplied from an external source, together with fluid operated means for holding the piece to be tested in position and a single control means controlling holding and release of the piece to be tested and all operations of the hardness testing device.

These and other objects of my invention will appear from time to time as the following specification proceeds and with reference to the accompanying drawings wherein:

Figure 3 is a diagrammatic view illustrating the piping and electrical connections for operating the hardness testing device and holding or releasing the piece of work being tested.

Figure 1:
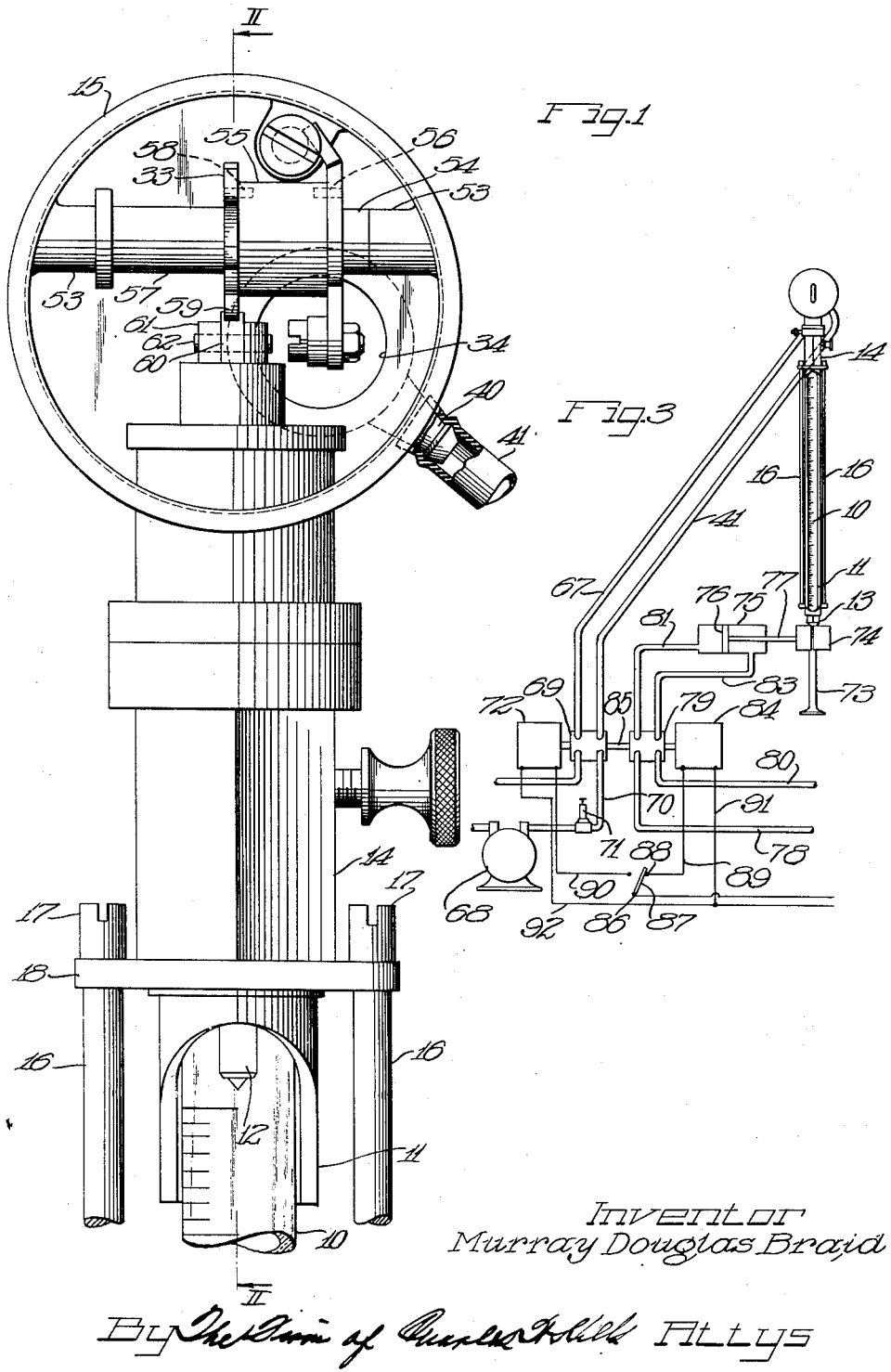
Figure 1 is a fragmentary front end view of a hardness testing instrument constructed in accordance with my invention and with the front cover thereof removed in order to show certain details of construction thereof.
Figure 2:
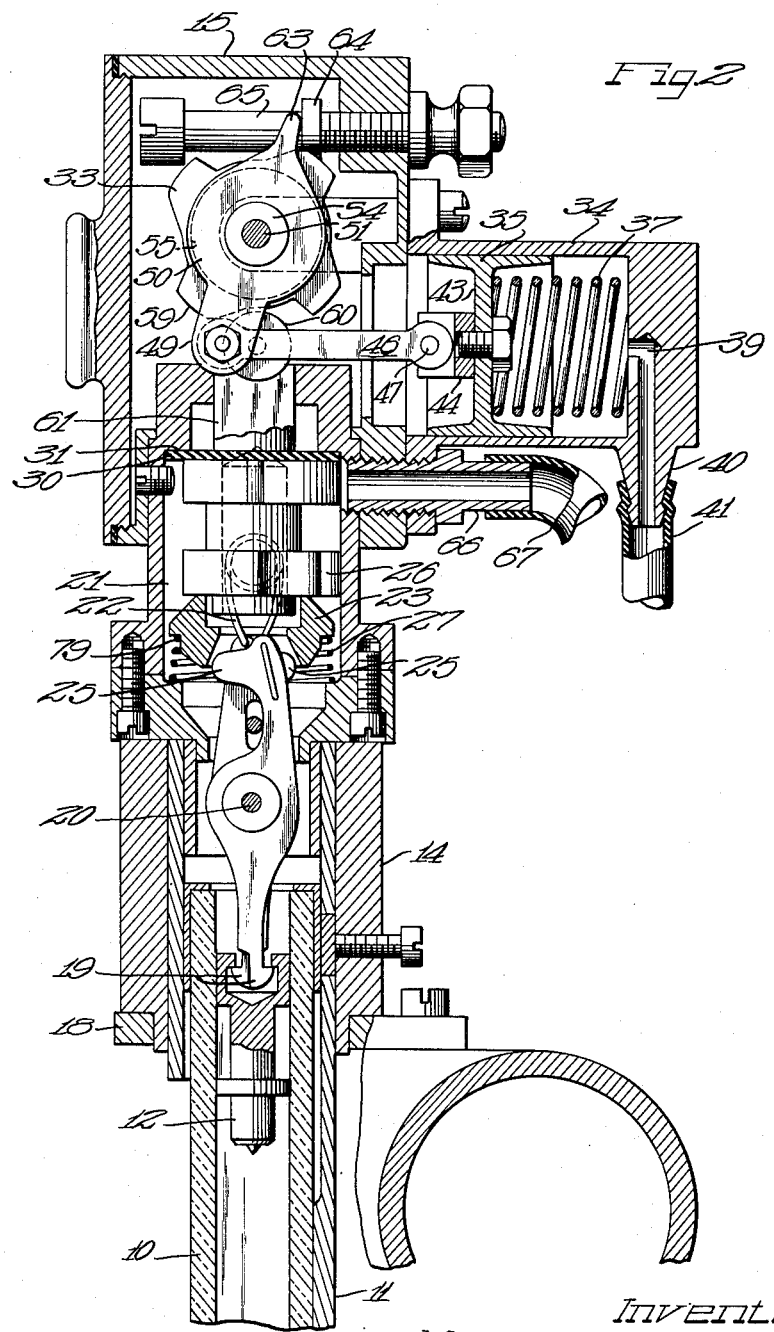
Figure 2 is a fragmentary transverse sectional view taken substantially along line II—II of Figure 1.

The hardness testing instrument of my invention, as shown in Figures 1 and 2 of the drawings, is constructed along lines similar to the "Shore Standard Scleroscope," the detailed construction and principle of operation of which are well known to those skilled in the art, so the parts similar to those of the "Scleroscope" need only herein be shown and described in sufficient detail to make my present invention readily understandable.

The hardness testing device includes generally a tube 10 which may be made of glass or any other suitable transparent material protected at its rear end portion and sides by a shield 11. The tube 10 is open and graduated at its front so that the rebound of a diamond tipped drop hammer 12, slidably mounted therein, may readily be observed and noted. The tube 10 may be protected at its bottom by a metal end piece 13 open at its center to permit the end of the hammer 12 to drop therethrough onto the piece of metal being tested (Figure 3). The end piece 13 may be connected to a casing 14 encircling the upper end of the shield 11 by spaced rods 16—16 extending along opposite sides of the tube 10 and secured to a yoke 18 extending across the lower end of said casing, as by machine screws 17—17. The testing device may be suitably supported on a bench (not shown) and may be vertically adjusted with respect to the work being tested in any suitable manner well known to those skilled in the art so not herein shown or described.

The hammer 12 is slidably mounted in the tube 10 to freely drop therealong when released and fits closely enough within said tube that it may be moved upwardly to its initial operating position by suction. The hammer 12 is held in position to be dropped on the piece of work to be tested by a hanger consisting of a pair of hooks 19 pivoted intermediate their ends on a horizontal pivot pin 20. Pivotal pin 20 is mounted in the side walls of a tube chamber 21 enclosed by the casing 14 and spaced upwardly from and in alignment with the open upper end of the tube 10. The hooks 19—19 are urged in position to engage the shoulders of a recessed top portion of the hammer 12 to hold said hammer in position to drop by means of a spring 22 engaging opposite upper ends of the hooks. The hooks 19—19 are released by an internal cone 23 encircling the upper end portions of said hooks and engageable with projecting portions 25—25 thereof and pivoting the hooks 19—19 inwardly toward the center of the tube 10 upon downward movement of said cone 23 into engagement with said projecting portions. The cone 23 is herein shown as being of an internal frusto-conical formation engaging the under portion of a valve element 26. A compression spring 27, seated in a shouldered portion 29 of the tube chamber 21, engages the cone 23 and urges said cone into engagement with said valve element 26 and into position to allow the hooks 19—19 to engage the hammer 12. The spring 27 also urges the valve element 26 in position to close the upper end of tube chamber 21 and prevent the entrance of air therein at atmospheric pressure from the head 15 of the instrument.

The valve element 26 has a resilient upper face 30, formed from rubber Neoprene or any other suitable material and mounted on the top face of said valve element and adapted to be seated against a downwardly facing shouldered portion 31 of the tube chamber 21 to prevent the passage of air from the head 15 into said tube chamber.

The valve element 26 is moved into position to open, and the cone 23 is moved downwardly against the spring 27 to release the hanger hooks 19—19 from the drop hammer 12 by means of a cam 33 operated by suction in a vacuum chamber or cylinder 34. A piston 35 is mounted in cylinder 34 for movement therealong and is urged into extended position by a compression spring 37 interposed between the head end of the cylinder 34 and said piston. A passageway 39 enters the head end of the cylinder 34 from one side thereof through a connecting lug 40 extending therefrom. A vacuum or suction line 41, which may be a rubber hose, is herein shown as being connected thereto to create a vacuum in the cylinder 34 and move the piston 35 toward the head end thereof against the compression spring 37.

The piston 35 has a central web 43 having a coupling member 44 secured thereto and extending from the side thereof opposite the spring 37. The coupling member 44 is herein shown as being of a bifurcated formation and has a link 46 pivotally connected thereto between the furcations thereof by a pivotal pin 47. The opposite end of the link 46 from the coupling member 44 is pivotally connected to a depending arm 49 of a rocking member 50. The rocking member 50 is pivotally mounted on a transverse shaft 51 mounted adjacent its ends in support bosses 53—53 extending inwardly from opposite side walls of the head 15. The rocking member 50 is pivotally mounted on a reduced portion 54 of a spacing collar 55 pivotally mounted on the transverse shaft 51 and abuts one face of said spacing collar. A pin 56 is provided to lock said rocking member to said collar. The cam 33 is mounted on a reduced portion 57 of the spacing collar 55 and abuts the opposite end thereof from the rocking member 50 and is secured thereto as by a pin 58. The creation of suction within the suction chamber 34 will thus move the piston 35 against the spring 37 toward the head end thereof and will pivotally move the cam 33 in a counter-clockwise direction engaging a high portion 59 thereof with a roller 60 to depress said roller.

The roller 60 is mounted between the furcations of an upright plunger 61 on a pivotal pin 62. The plunger 61 is herein shown as being an upward extension of the valve element 26 and as being slidably guided in the upper end wall of the tube chamber 21.

A stop 63 projects upwardly from the rocking member 50 and is adapted to engage a shouldered portion 64 of an adjusting screw 65 threaded in a rear end wall of the head 15 and serves to limit rocking movement of said rocking member in a release direction.

Thus upon the creation of a vacuum in the vacuum chamber 34, the cam 33 will move in a counter-clockwise direction, the high portion 59 thereof depressing the plunger 61 to open the valve to the tube chamber 21 and admit air to said chamber at atmospheric pressure and also moving the internal cone 23 into engagement with the projecting portions 25—25 of the hooks 19—19 to release the hammer 12 and allow it to drop along the tube 10 onto the work to be tested. When it is desired to raise the drop hammer along the tube 10, air at atmospheric pressure is admitted to the suction line 41 and passageway 39. This allows the spring 37 to move the piston 35 away from the head end of the suction cylinder 34. This will move cam 33 in a clockwise direction through the link 46 and rocking member 50 and will allow the roller 60 to ride into the low portion of said cam. The spring 27 will then disengage the cone 23 from the hooks 19—19 and close the valve formed by the gasket 30 engaging the shouldered portion 31 of the tube chamber 21. At this time, suction is created in the tube chamber 21 through a fitting 66 threaded therein and opening to said chamber and having a suction or vacuum line 67 secured to its outer end and connected to a source of vacuum. This will suck the hammer 12 upwardly along the tube 10 into engagement with the hooks 19—19 to hang said drop hammer in said tube until released by the cone 23.

Referring now to Figure 3, a vacuum pump 68 is diagrammatically shown as being connected with a four-way valve 69 by a suction line 70. A vacuum release valve 71 is herein shown as being provided in said suction line. The vacuum pump 68 may be of any well-known form, driven from a suitable electric motor, and is not herein shown or described in detail since it is no part of my present invention.

The four-way vacuum valve 69 may be of any well known form and is herein shown as being operated by a solenoid 72 in a usual manner. The suction line 41 is connected with one port of the valve 69 while the suction line 67 is connected with another port of said valve. Thus, when valve 69 is one one operative position, the vacuum pump 68 will be connected with the suction line 41 to create a vacuum in a vacuum chamber 34 and move the cam 33 in a direction to release the drop hammer 12. In this position of the valve 69, the suction line 67 is opened to pressure from the atmosphere. When the valve 69 is in an opposite position, the suction line 67 is connected with the vacuum pump 68, thus creating a vacuum in the tube chamber 21 to return the drop hammer 12 into engagement with the hanger hooks 19—19, it being understood that during this position of the valve 69 the release of vacuum from the vacuum chamber 34 will allow the spring 37 to move the cam 33 in a position to permit the spring 27 to close the tube chamber from pressure from the atmosphere and to move the cone 23 out of engagement with the projecting portions 25—25 of the hanger hooks 19—19.

The hardness measuring instrument is shown in Figure 3 as being supported in position to test the hardness of the valves of the type used in internal combustion engines. Each valve 73 is diagrammatically shown as being held in position to be tested by a fluid operated vise 74 operated by a double acting cylinder 75. The cylinder is diagrammatically shown as having a piston 76 movable therein with a piston rod 77 extending therefrom and operatively connected with the vise 74 to clamp the jaws of the vise around the stem of the valve. The testing device may be suitably supported on the top of a table or work bench (not shown) and the vise 99 may be mounted on one side thereof facing the operator of the instrument, and after the hardness of the work piece has been tested the jaws of the vise may be released to allow the piece to drop into a basket or carrier.

Fluid under pressure may be provided to operate the vise by means of a suitable fluid pump (not shown) which may be of any form well known to those skilled in the art. A pressure line 78 may lead from said pump to a solenoid operated four-way valve 79. A return line 80 may lead from said valve to discharge air to the atmosphere. A pressure line 81 is shown as leading from one port of the four-way valve 79 to the head end of cylinder 75. Another pressure line 83 leads from another port of the four-way valve 79 to the piston rod end of the cylinder 75. The four-way valve 79 is shown as being operated by a solenoid 84 having an armature 85 extending therethrough. As herein shown, the armature 85 is operatively connected with the valves 79 and 69 and also forms the armature of the solenoid 72. The solenoid 72 thus moves the armature 85 in one direction and moves the two valves in one position of operation to connect the suction line 41 with the vacuum pump 68 and at the same time connect the pressure line 81 with the pressure line 78 and cause the vice 74 to grip the article being tested, it being understood that the timing of the gripping operation of the piece to be tested and dropping of the hammer 12 is such that the vice 74 first grips the piece to be tested and holds it in position, and the hammer 12 is then released to drop on the piece.

The solenoids 72 and 84 are herein shown as being operated by a switch 86. The switch 86 may be of any well known form operated either by the hand or foot, but for the sake of convenience may preferably be a foot operated switch This switch is shown as being of a double throw type having a contact arm 87 engageable with a contact 88 to close a circuit to the solenoid 84 through a conductor 89. The other contact of the switch 86 is connected through contact arm 87 with the solenoid 72 through a conductor 90. The other terminals of the solenoids 84 and 69 are connected to a source of power supply by means of conductors 91 and 92.

When foot pressure is exerted on the switch 86 a circuit is completed through the solenoid 84, energizing said solenoid and clamping the test piece to the vise 74 and also moving the valve 69 in position to connect the vacuum line 41 to the vacuum pump 68 to create a vacuum in the cylinder 34 and release the hammer 12 to drop onto the piece to be tested. After the hammer has rebounded from the test piece and the visual hardness reading noted, the foot may be released from the switch 86. The contact arm 87 will then close a circuit through the conductor 90 to energize the solenoid 72 and reverse operation of the vacuum valve 69 and the fluid pressure control valve 79. The valve 79 will then supply fluid under pressure to the piston rod end of the cylinder 75 and release the vice 74, allowing the piece tested to drop therefrom. Reversal of the four-way vacuum valve 69 will open the vacuum line 41 to pressure from the atmosphere, permitting the spring 37 to return the piston 35 to the piston rod end of the cylinder 34 and move the cam 33 into a position to allow the spring 27 to close the tube chamber 21. It will also create a vacuum in the tube chamber 21 to suck the hammer 21 to the top of the tube 10 for engagement by the hooks 19—19 to be held thereby in position for the next testing operation.

It will be understood that modifications and variations may be effected without departing from the scope of the novel concepts of the present invention.

I claim as my invention:

1. In a hardness testing instrument including a tube chamber, a tube leading therefrom, a hammer guided within said tube to drop therealong onto the material to be tested, means within said chamber operable to hold said hammer in an elevated position in said tube, a suction outlet for said chamber for applying suction therein and raising said hammer along said tube in position to be engaged by said holding means, a valve closing said tube chamber and movable into position to admit air therein, means movable with said valve for releasing said holding means upon opening of said valve, a rotatable cam operable to move said valve to an open position, spring means moving said valve to a closed position, the improvements comprising a suction cylinder, a piston therein, a connection between said piston and cam moving said cam into position to open said valve and release said hammer upon the creation of suction within said cylinder, spring means engaging said piston and moving said cam into position to allow closing of said valve, a vacuum pump, a second valve, a suction line connecting said pump with said second valve, separate suction lines connecting said second valve with said cylinder and said tube chamber, said second valve also having communication with the atmosphere, and means for operating said second valve to selectively connect said pump to establish a vacuum in either said suction cylinder or said tube chamber.

2. In a control means for a hardness testing device including a reboundable hammer, means for holding said hammer in an elevated position ready to be dropped on the material to be tested, suction means for returning the hammer to its elevated position, other suction means for releasing the hammer, a valve controlling the creation of suction in both of said suction means, a vise disposed beneath said hardness testing device to hold the piece to be tested, fluid operated means for moving said vise to a gripping and released position, a valve controlling operation of said fluid operated means, and a single control member controlling operation of both of said valves to cause said vise to grip the piece to be tested and to then release said hammer to drop on the piece to be tested and to then release said vise and create suction to return the hammer to its elevated position.

3. In a control means for a hardness testing device including a reboundable hammer, means for holding said hammer in an elevated position ready to be dropped on the material to be tested, suction means for returning the hammer to its elevated position, other suction means for releasing the hammer, a vacuum pump, a valve connecting said vacuum pump to both of said suction means, a vise disposed beneath said hardness testing device to hold the piece to be tested, fluid operated means for moving said vise into gripping and released positions, a valve controlling the operation of said fluid operated means, electrical means for operating said valves, and a single switch operable to energize said electrical means and move said valves to certain operative positions to cause said vise to grip the piece to be tested and to then connect said vacuum pump to said suction means for releasing said hammer to drop on the piece to be tested when said switch is in one position and to release the said vise and connect said vacuum pump to said suction means to return said hammer to its elevated position.

4. In a control means for a hardness testing device including a reboundable hammer, means for holding said hammer in an elevated position ready to be dropped on the material to be tested, suction means for returning the hammer to its elevated position, other suction means for releasing the hammer, a vacuum pump, a valve connecting said vacuum pump to both of said suction means, a vise disposed beneath said hardness testing device to hold the piece to be tested, fluid operated means for moving said vise into gripping and released positions, a valve controlling the operation of said fluid operated means, electrical means for operating said valves including two solenoids having a common core connecting said valves together, and a single switch operable to alternately energize said solenoids to effect movement of said valves into position to effect gripping of the piece to be tested by said vise and to connect said vacuum pump to said suction means to release said hammer and create suction therein and release said hammer to drop on the piece to be tested and to release said vise and connect said vacuum pump to said suction means to return said hammer to an elevated position to create suction therein and return said hammer to be dropped on the next piece to be tested.

5. An instrument for measuring the hardness of metals comprising a chamber, a tube extending therefrom, a hammer slidable within said tube, a valve controlling the entrance of air to said chamber at atmospheric pressure, means for holding said hammer in an elevated position in said tube, a rotatable cam engageable with said valve to place said valve to open said chamber in communication with air at atmospheric pressure and to release said holding means, a suction cylinder having a piston therein, a link connecting said piston with said cam, spring means moving said piston along said cylinder in a direction to move said cam into position to accommodate said valve to close, a source of suction, a suction line connected to said cylinder to create suction therein and effect movement of said piston against said spring means and movement of said cam in a direction to open said valve and release said holding means to drop said hammer, a second suction line connected to said chamber to establish suction therein and to effect raising of said hammer along said tube into position to be dropped, and a single valve connecting said source of suction to said suction lines and also connecting said suction lines to the atmosphere and operable when in one position to create suction in said cylinder and connect the suction line leading to said chamber to atmosphere and when in a second position to create suction in said chamber and connect said suction line leading to said cylinder to atmosphere.

MURRAY DOUGLAS BRAID.

References Cited in the file of this patent

UNITED STATES PATENTS

| Number | Name | Date |
|---|---|---|
| 1,121,050 | Shore | Dec. 15, 1914 |
| 2,424,177 | Lawshe et al. | July 15, 1947 |
| 2,427,151 | Mick | Sept. 9, 1947 |